United States Patent
Huang et al.

(10) Patent No.: US 10,433,199 B2
(45) Date of Patent: Oct. 1, 2019

(54) REPORTING TECHNIQUES FOR REFERENCE SIGNAL RECEIVED QUALITY (RSRQ) MEASUREMENTS

(71) Applicant: INTEL IP CORPORATION, Santa Clara, CA (US)

(72) Inventors: Rui Huang, Beijing (CN); Yang Tang, Pleasanton, CA (US); Zhibin Yu, Unterhaching (DE); Tian Yan Pu, Dresden (DE)

(73) Assignee: INTEL IP CORPORATION, Santa Clara, CA (US)

( * ) Notice: Subject to any disclaimer, the term of this patent is extended or adjusted under 35 U.S.C. 154(b) by 40 days.

(21) Appl. No.: 15/300,834

(22) PCT Filed: Mar. 28, 2015

(86) PCT No.: PCT/US2015/023208
§ 371 (c)(1),
(2) Date: Sep. 30, 2016

(87) PCT Pub. No.: WO2015/171216
PCT Pub. Date: Nov. 12, 2015

(65) Prior Publication Data
US 2017/0026867 A1 Jan. 26, 2017

Related U.S. Application Data

(60) Provisional application No. 61/990,912, filed on May 9, 2014.

(51) Int. Cl.
*H04W 4/10* (2009.01)
*H04W 24/10* (2009.01)
(Continued)

(52) U.S. Cl.
CPC ............ *H04W 24/10* (2013.01); *H04B 17/24* (2015.01); *H04B 17/318* (2015.01); *H04L 25/00* (2013.01);
(Continued)

(58) Field of Classification Search
CPC ........... H04L 1/20; H04L 5/0032; H04L 1/00; H04W 24/08; H04W 24/10;
(Continued)

(56) References Cited

U.S. PATENT DOCUMENTS

| | | | |
|---|---|---|---|
| 2012/0115463 A1 | 5/2012 | Weng et al. | |
| 2013/0077508 A1* | 3/2013 | Axmon | H04W 24/00 370/252 |

(Continued)

FOREIGN PATENT DOCUMENTS

| | | |
|---|---|---|
| JP | 5756129 B2 | 7/2015 |
| WO | 2013000411 A1 | 1/2013 |
| WO | 2013067973 | 5/2013 |

OTHER PUBLICATIONS

International Search Report dated Jul. 13, 2015 for International Patent Application No. PCT/JP2015/023208.

(Continued)

*Primary Examiner* — Jung Liu

(57) ABSTRACT

Reporting techniques for reference signal received quality (RSRQ) measurements are described. In one embodiment, for example, user equipment (UE) may comprise at least one radio frequency (RF) transceiver, at least one RF antenna, and logic, at least a portion of which is in hardware, the logic to measure a received signal strength indicator (RSSI), determine a reference signal received quality (RSRQ) measured quantity value based on the measured RSSI, and map the RSRQ measured quantity value to an RSRQ reporting value according to an RSRQ measurement report mapping (Continued)

*300*

| | RSRQ Reporting Value | Measured Quantity Value (dB) |
|---|---|---|
| | RSRQ_00 | RSRQ < -19.5 |
| | RSRQ_01 | -19.5 < RSRQ ≤ -19 |
| Legacy Range 302 | RSRQ_02 | -19 < RSRQ ≤ -19 |
| | RSRQ_03 | -19 < RSRQ ≤ -18.5 |
| | ... | ... |
| | RSRQ_32 | -4 < RSRQ ≤ -3.5 |
| | RSRQ_33 | -3.5 < RSRQ ≤ -3 |
| | Extended Range Reporting Value 1 | -3 < RSRQ ≤ -2.5 |
| | Extended Range Reporting Value 2 | -2.5 < RSRQ ≤ -2 |
| Extended Range 304 | Extended Range Reporting Value 3 | -2 < RSRQ ≤ -1.5 |
| | ... | ... |
| | Extended Range Reporting Value 10 | 1.5 < RSRQ ≤ 2 |
| | Extended Range Reporting Value 11 | 2 < RSRQ ≤ 2.5 |
| | Extended Range Reporting Value 12 | 2.5 ≤ RSRQ | scheme comprising an extended RSRQ reporting range according to which one or more defined RSRQ reporting values correspond to RSRQ measured quantity values exceeding −3 dB. Other embodiments are described and claimed.

24 Claims, 9 Drawing Sheets

(51) Int. Cl.
  *H04B 17/24* (2015.01)
  *H04B 17/318* (2015.01)
  *H04L 25/00* (2006.01)
  *H04W 24/08* (2009.01)
  *H04W 76/27* (2018.01)
  *H04L 5/00* (2006.01)
  *H04W 88/02* (2009.01)

(52) U.S. Cl.
  CPC ........... *H04W 24/08* (2013.01); *H04L 5/0007* (2013.01); *H04W 76/27* (2018.02); *H04W 88/02* (2013.01)

(58) Field of Classification Search
  CPC ......... H04W 36/0094; H04W 52/0229; H04W 48/16; H04W 52/0235; H04W 52/0254; H04W 60/005; H04W 48/18; H04W 76/026; Y02D 70/24; Y02D 70/00; Y02D 70/1262; H04J 11/005
  See application file for complete search history.

(56) References Cited

U.S. PATENT DOCUMENTS

| | | | |
|---|---|---|---|
| 2013/0225188 A1 | 8/2013 | Seo et al. | |
| 2013/0308489 A1* | 11/2013 | Tomala | H04W 24/08 370/252 |
| 2013/0336148 A1 | 12/2013 | Ishii et al. | |
| 2014/0105016 A1* | 4/2014 | Tsuda | H04W 4/00 370/230.1 |
| 2014/0233408 A1* | 8/2014 | Bontu | H04W 36/0094 370/252 |
| 2015/0131465 A1* | 5/2015 | Dalsgaard | H04W 24/10 370/252 |
| 2015/0156664 A1* | 6/2015 | Tsuda | H04W 28/0284 370/252 |

OTHER PUBLICATIONS

Ericsson et al., "Introduction of UE capability signaling for wideband RSRQ measurements", R2-132944, 3GPP TSG-WG2 Meeting #83, Barcelona, Spain, Aug. 24, 2013 (http://www.3gpp.org/ftp/tsg_ran/WG2_RL2/TSGR2_83/Docs/) See pp. 1-8.

Ericsson et al., "Introduction of UE capability signaling for wideband RSRQ measurements", R2-132945, 3GPP TSG-WG2 Meeting #83, Barcelona, Spain, Aug. 24, 2013 (http://www.3gpp.org/ftp/tsg_ran/WG2_RL2/TSGR2_83/Docs/) See pp. 1-11.

NTT Docomo, Inc., "Introduction of wideband RSRQ measurements", R2-124813, 3GPP TSG-RAN WG2 Meeting #79bis, Bratislava, Slovakia, Sep. 29, 2012 (http://www.3gpp.org/ftp/tsg_ran/WG2_RL2/TSGR2_79bis/Docs/) See pp. 1-7.

NTT Docomo, Inc., "Introduction of wideband RSRQ measurements", R2-124814, 3GPP TSG-RAN WG2 Meeting #79bis, Bratislava, Slovakia, Sep. 29, 2012 (http://www.3gpp.org/ftp/tsg_ran/WG2_RL2/TSGR2_79bis/Docs/) See pp. 1-10.

Search Report received for Australian Patent Application No. 2015256627, dated Jun. 15, 2017, 5 pages.

"RSRQ Reporting Range", TSG-RAN Working Group 4 (Radio) meeting #47bis, Munich, Germany, Jun. 16-20, 2008, R4-081419, Ericsson, p. 1-4.

Chen et al., "Grey Prediction Based Hard Handover Hysteresis Algorithm for 3GPP LTE System", 2012 Seventh International Conference on Broadband, Wireless Computing, Communication and Applications, IEEE 2012, p. 590-595.

"LTE;Evolved Universal Terrestrial Radio Access (E-UTRA); Requirements for support of radio resource management (3GPP TS 36.133 version 10.5.0 Release 10)", ETSI TS 136 133 V10.5.0 (Jan. 2012), Jan. 2012, p. 0-545.

LTE; Evolved Universal Terrestrial Radio Access (E-UTRA); Physical layer—Measurements (3GPP TS 36.214 version 9.1.0 Release 9), ETSI TS 136 214 V9.1.0 (Apr. 20104), Apr. 2010, p. 0-15.

Extended European Search Report received for European Patent Application No. 15788860.3, dated Oct. 18, 2017, 10 pages.

Ericsson: "Increasing RSRQ reporting range", 3GPP Draft; R4-140409, RAN WG4, Feb. 9, 2014.

Office Action received for Japanese Patent Application No. JP2017-511145, dated Jan. 18, 2018, 7 pages including 4 pages English translation.

3rd Generation Partnership Project; Technical Specification Group Radio Access Network; Evolved Universal Terrestrial Radio Access (E-UTRA); Physical Layer; Measurements (Release 11), 3GPP TS 36.214, V11.1.0, (Dec. 2012), 15 pages.

\* cited by examiner

| RSRQ Reporting Value | Measured Quantity Value (dB) |
|---|---|
| RSRQ_00 | RSRQ < -19.5 |
| RSRQ_01 | -19.5 < RSRQ < -19 |
| RSRQ_02 | -19 < RSRQ < -19 |
| RSRQ_03 | -19 < RSRQ < -18.5 |
| ... | ... |
| RSRQ_32 | -4 < RSRQ < -3.5 |
| RSRQ_33 | -3.5 < RSRQ < -3 |
| Extended Range Reporting Value 1 | -3 < RSRQ < -2.5 |
| Extended Range Reporting Value 2 | -2.5 < RSRQ < -2 |
| Extended Range Reporting Value 3 | -2 < RSRQ < -1.5 |
| ... | ... |
| Extended Range Reporting Value 10 | 1.5 < RSRQ < 2 |
| Extended Range Reporting Value 11 | 2 < RSRQ < 2.5 |
| Extended Range Reporting Value 12 | 2.5 ≤ RSRQ |

Legacy Range 302 (rows RSRQ_00 through RSRQ_33)

Extended Range 304 (Extended Range Reporting Values 1 through 12)

Broadband Wireless Access System
900

REPORTING TECHNIQUES FOR REFERENCE SIGNAL RECEIVED QUALITY (RSRQ) MEASUREMENTS

CROSS-REFERENCE TO RELATED APPLICATIONS

This application is a national phase claiming the benefit of and priority to International Patent Application No. PCT/US2015/023208, entitled "REPORTING TECHNIQUES FOR REFERENCE SIGNAL RECEIVED QUALITY (RSRQ) MEASUREMENTS", filed Mar. 28, 2015, which claims priority to U.S. Provisional Patent Application No. 61/990,912, entitled "REPORTING TECHNIQUES FOR REFERENCE SIGNAL RECEIVED QUALITY (RSRQ) MEASUREMENTS", filed May 9, 2014, which are hereby incorporated by reference in their entireties.

RELATED CASE

This application claims priority to U.S. Provisional Patent Application No. 61/990,912, filed May 9, 2014, the entirety of which is hereby incorporated by reference.

TECHNICAL FIELD

Embodiments herein generally relate to communications between devices in broadband wireless communications networks.

BACKGROUND

In a wireless communication network such as an Evolved Universal Mobile Telecommunications System Terrestrial Radio Access Network (E-UTRAN), user equipment (UE) may perform various carrier measurements in support of mobility management procedures. One example of a carrier measurement that a UE may perform is a reference signal received quality (RSRQ) measurement. In order to measure an RSRQ, a UE may measure an RSSI for a measurement bandwidth and determine an RSRQ measurement based on the RSSI measurement. In order to report an RSRQ measurement to an evolved node B (eNB), a UE may identify an RSRQ reporting value that corresponds to that RSRQ measurement and send a message comprising the RSRQ reporting value to the eNB.

BRIEF DESCRIPTION OF THE DRAWINGS

FIG. 3 illustrates an embodiment of an RSRQ measurement report mapping table.

DETAILED DESCRIPTION

Figure 1:
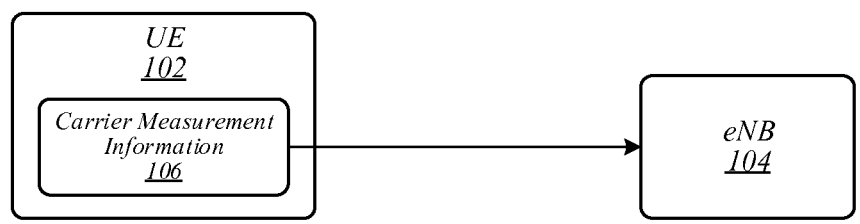
FIG. 1 illustrates an embodiment of a first operating environment.

Various embodiments may be generally directed to reporting techniques for reference signal received quality (RSRQ) measurements. In one embodiment, for example, user equipment (UE) may comprise at least one radio frequency (RF) transceiver, at least one RF antenna, and logic, at least a portion of which is in hardware, the logic to measure a received signal strength indicator (RSSI), determine a reference signal received quality (RSRQ) measured quantity value based on the measured RSSI, and map the RSRQ measured quantity value to an RSRQ reporting value according to an RSRQ measurement report mapping scheme comprising an extended RSRQ reporting range according to which one or more defined RSRQ reporting values correspond to RSRQ measured quantity values exceeding −3 dB. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

The techniques disclosed herein may involve transmission of data over one or more wireless connections using one or more wireless mobile broadband technologies. For example, various embodiments may involve transmissions over one or more wireless connections according to one or more 3rd Generation Partnership Project (3GPP), 3GPP Long Term Evolution (LTE), and/or 3GPP LTE-Advanced (LTE-A) technologies and/or standards, including their revisions, progeny and variants. Various embodiments may additionally or alternatively involve transmissions according to one or more Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS) technologies and/or standards, including their revisions, progeny and variants.

Examples of wireless mobile broadband technologies and/or standards may also include, without limitation, any of the Institute of Electrical and Electronics Engineers (IEEE) 802.16 wireless broadband standards such as IEEE 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1xRTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their revisions, progeny and variants.

Some embodiments may additionally or alternatively involve wireless communications according to other wireless communications technologies and/or standards. Examples of other wireless communications technologies and/or standards that may be used in various embodiments may include, without limitation, other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, and/or IEEE 802.11ah standards, High-Efficiency Wi-Fi standards developed by the IEEE 802.11 High Efficiency WLAN (HEW) Study Group, Wi-Fi Alliance (WFA) wireless communication standards such as Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any revisions, progeny, and/or variants of any of the above. The embodiments are not limited to these examples.

In addition to transmission over one or more wireless connections, the techniques disclosed herein may involve transmission of content over one or more wired connections through one or more wired communications media. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

FIG. 1 illustrates an example of an operating environment 100 that may be representative of various embodiments. In operating environment 100, a UE 102 is located in a cell 103, which is generally served by an eNB 104. In some embodiments, cell 103 may comprise a cell of an Evolved Universal Mobile Telecommunications System Terrestrial Radio Access Network (E-UTRAN). In various embodiments, during general operation, UE 102 may perform various carrier measurements in support of mobility management procedures. In some embodiments, such carrier measurements may include measurements of carriers used in cell 103. In various embodiments, such carrier measurements may additionally or alternatively include measurements of carriers used in one or more nearby cells. In some embodiments, UE 102 may perform carrier measurements while operating in an RRC_IDLE state. In various embodiments, UE 102 may additionally or alternatively perform carrier measurements while operating in an RRC_CONNECTED state. In some embodiments, in order to report a given carrier measurement to eNB 104, UE 102 may send carrier measurement information 106 to eNB 104. The embodiments are not limited in this context.

In various embodiments, UE 102 may perform one or more reference signal received quality (RSRQ) measurements. In some embodiments, in order to perform a given RSRQ measurement, UE 102 may measure an RSSI for a measurement bandwidth and determine the value of the RSRQ measurement based on the measured RSSI. In various embodiments, in order to report an RSRQ measurement to eNB 104, UE 102 may map the RSRQ measurement value to an RSRQ reporting value and send carrier measurement information 106 comprising the RSRQ measurement value to eNB 104. In some such embodiments, UE 102 may map the RSRQ measurement value to the RSRQ reporting value according to an RSRQ measurement report mapping scheme. In various embodiments, the RSRQ measurement report mapping scheme may define mappings for RSRQ measurement values within a range of prospective RSRQ measurement values. In some embodiments, the RSRQ measurement report mapping scheme may define a plurality of RSRQ measurement value subranges within the range of prospective RSRQ measurement values, and may specify a respective corresponding RSRQ reporting value for each of the plurality of RSRQ measurement value subranges. The embodiments are not limited in this context.

In various embodiments, UE 102 may perform one or more RSRQ measurements according to a modified RSRQ measurement procedure. In some embodiments, for example, UE 102 may perform one or more RSRQ measurements according to a modified RSRQ measurement procedure define in 3GPP Release 12. In various embodiments, in conjunction with performing RSRQ measurements according to the modified RSRQ measurement procedure, UE 102 may measure RSSIs according to a modified RSSI measurement procedure. In some embodiments, according to such a modified RSSI measurement procedure, UE 102 may measure an RSSI for a measurement bandwidth as a linear average of the total received powers in all OFDM symbols in that measurement bandwidth in one subframe, divided by the number of OFDM symbols in that subframe. The embodiments are not limited in this context.

In various embodiments, it may be possible for the value of an RSRQ measurement performed according to the modified RSRQ measurement procedure to lie substantially outside an expected range of possible RSRQ measurement values according to a legacy RSRQ measurement procedure. In such embodiments, if UE 102 is configured to determine RSRQ reporting values according to an RSRQ measurement report mapping scheme that only defines RSRQ measurement value subranges within an RSRQ measurement value range contemplated based on the legacy RSRQ measurement procedure, UE 102 may be unable to report some RSRQ measurements with a desirable level of accuracy.

Disclosed herein are reporting techniques for RSRQ measurements such as may be implemented in some embodiments in order to enable UEs to accurately report RSRQ measurements performed according to such a modified RSRQ measurement procedure. In various embodiments, for example, a UE may implement the disclosed reporting techniques for RSRQ measurements in order to report RSRQ measurements performed according to a modified RSRQ measurement procedure defined in 3GPP Release 12. According to the disclosed techniques, in some embodiments, an enhanced RSRQ measurement reporting procedure may be implemented in order to enable UEs to accurately report RSRQ measurements performed according to a modified RSRQ measurement procedure. In various embodiments, an enhanced RSRQ measurement report mapping scheme may be implemented in conjunction with the enhanced RSRQ measurement reporting procedure. In some embodiments, the enhanced RSRQ measurement report mapping scheme may feature an extended RSRQ reporting range. In various embodiments, after performing an RSRQ measurement according to the modified RSRQ measurement procedure, a UE may perform the enhanced RSRQ measurement reporting procedure, according to which it may map the RSRQ measurement value to an RSRQ reporting value according to the enhanced RSRQ measurement report mapping scheme. In some such embodiments, the UE may then send a message comprising the RSRQ reporting value to an eNB in order to report the RSRQ measurement that it performed according to the modified RSRQ measurement procedure. The embodiments are not limited in this context.

Figure 2:
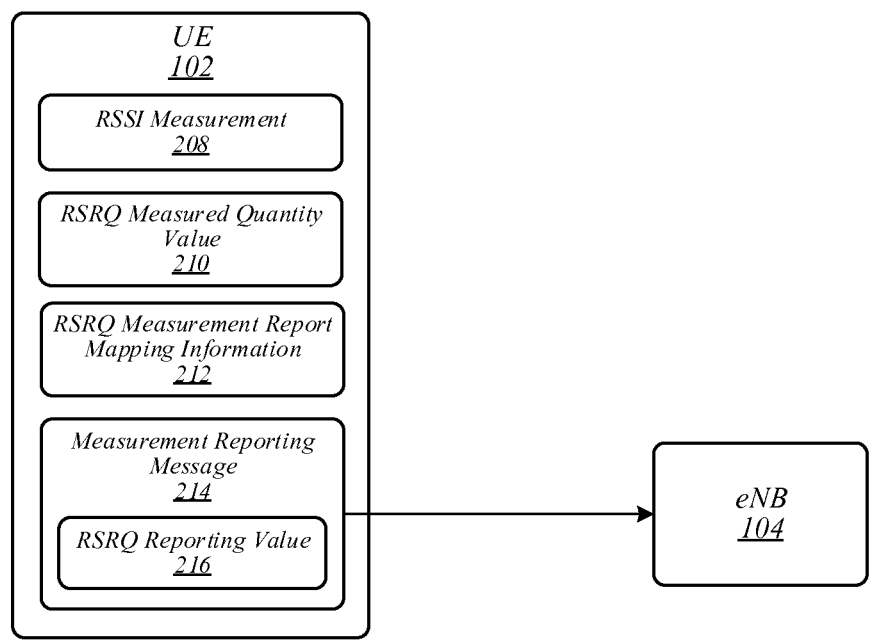
FIG. 2 illustrates an embodiment of a second operating environment.

FIG. 2 illustrates an example of an operating environment 200 that may be representative of various embodiments in which disclosed reporting techniques for RSRQ measurements may be implemented. In operating environment 200, UE 102 may determine an RSSI measurement 208 for a measurement bandwidth comprising frequency carriers used in a cell of a radio access network such as an E-UTRAN. In some embodiments, the measurement bandwidth may comprise frequency carriers used in a cell served by eNB 104, such as cell 103 of FIG. 1. In various embodiments, the measurement bandwidth may comprise frequency carriers used in a nearby cell. In some embodiments, UE 102 may determine an RSRQ measured quantity value 210 based on the RSSI measurement 208.

In various embodiments, UE 102 may determine RSRQ measured quantity value 210 according to a modified RSRQ measurement procedure. In some embodiments, for example, UE 102 may determine RSRQ measured quantity value 210 according to a modified RSRQ measurement procedure define in 3GPP Release 12. In various embodiments, in conjunction with determining RSRQ measured quantity value 210 according to the modified RSRQ measurement procedure, UE 102 may determine RSSI measurement 208 according to a modified RSSI measurement procedure. In some such embodiments, according to the modified RSSI measurement procedure, UE 102 may determine RSSI measurement 208 for the measurement bandwidth as a linear average of the total received powers in all OFDM symbols in the measurement bandwidth in one subframe, divided by the number of OFDM symbols in that subframe. In various embodiments, it may be possible for an RSRQ measurement quantity value determined according to the modified RSRQ measurement procedure to lie outside an expected range of possible RSRQ measurement values according to a legacy RSRQ measurement procedure. For example, in some embodiments, an RSRQ measurement performed in a zero-traffic loading environment according to the modified RSRQ measurement procedure may potentially exceed a highest RSRQ measurement value contemplated by the legacy RSRQ measurement procedure by a substantial amount. The embodiments are not limited to this example.

In various embodiments, if UE 102 performs RSRQ measurements according to the modified RSRQ measurement procedure but reports those measurements according to a legacy RSRQ measurement reporting procedure that only contemplates RSRQ measurement values in a characteristic range of a legacy RSRQ measurement procedure, then UE 102 may not be able to accurately report some RSRQ measurements. For example, in some embodiments, a legacy RSRQ measurement reporting procedure may generally contemplate RSRQ measurements ranging from −19.5 dB to −3 dB. The legacy RSRQ measurement reporting procedure may map RSRQ measurements within the contemplated range to RSRQ reporting values at a level of granularity, such as 0.5 dB, that enables accurate reporting of RSRQ measurements within the contemplated range. However, the legacy RSRQ measurement reporting procedure may map all RSRQ measurements exceeding −3 dB to a same RSRQ reporting value. If the legacy RSRQ measurement procedure is being used, any RSRQ measurements that exceed −3 dB—if any—may generally do so by only a relatively small amount, such that the RSRQ reporting value corresponding to −3 dB still constitutes an accurate indicator of those measurements. On the other hand, if a modified RSRQ measurement procedure is being used that can yield RSRQ measurement values that substantially exceed −3 dB, the RSRQ reporting value to which such values would be mapped according to the legacy RSRQ measurement reporting procedure—the RSRQ reporting value corresponding to −3 dB—may not constitute an accurate indicator of those measurements. The embodiments are not limited to this example.

In various embodiments, in order to enable it to accurately report RSRQ measurements performed according to the modified RSRQ measurement procedure, UE 102 may be configured to report such measurements according to an enhanced RSRQ measurement reporting procedure. In some embodiments, the enhanced RSRQ measurement reporting procedure may utilize an enhanced RSRQ measurement report mapping scheme. In various embodiments, the enhanced RSRQ measurement report mapping scheme may feature an extended RSRQ reporting range. In some embodiments, according to the extended RSRQ reporting range, the enhanced RSRQ measurement report mapping scheme may map RSRQ measurements falling outside of a range contemplated by a legacy mapping scheme to RSRQ measurements at a level of granularity that enables accurate reporting of those RSRQ measurements. In various embodiments, for example, the enhanced RSRQ measurement report mapping scheme may map such RSRQ measurement to RSRQ reporting values with a granularity of 0.5 dB. The embodiments are not limited to this example.

In some embodiments, in conjunction with the application of the enhanced RSRQ measurement reporting procedure, UE 102 may map RSRQ measured quantity value 210 to an RSRQ reporting value 216. In various embodiments, UE 102 may map RSRQ measured quantity value 210 to RSRQ reporting value 216 based on RSRQ measurement report mapping information 212 that defines the enhanced RSRQ measurement report mapping scheme for the enhanced RSRQ measurement reporting procedure. In some embodiments, the enhanced RSRQ measurement report mapping scheme may define a plurality of RSRQ measured quantity value subranges and a plurality of RSRQ reporting values, and each of the plurality of RSRQ reporting values may correspond to a respective one of the plurality of RSRQ measured quantity value subranges. In various embodiments, UE 102 may identify, from among the plurality of RSRQ measurement value subranges, an RSRQ measurement value subrange that contains RSRQ measured quantity value 210. In some such embodiments, UE 102 may then identify RSRQ reporting value 216 as an RSRQ reporting value that corresponds to the identified RSRQ measurement value subrange. In various embodiments, the enhanced RSRQ measurement report mapping scheme may feature an extended RSRQ reporting range according to which the plurality of RSRQ measured quantity value subranges that it defines includes one or more RSRQ measured quantity value subranges that correspond to RSRQ measured quantity values of greater than −3 dB. In some embodiments, for example, the enhanced RSRQ measurement report mapping scheme may define a plurality of RSRQ measurement value subranges that includes 11 RSRQ measurement value subranges that collectively correspond to RSRQ measurement values ranging from −3 dB to 2.5 dB. The embodiments are not limited to this example.

In various embodiments, UE 102 may send a measurement reporting message 214 comprising the RSRQ reporting value 216 to eNB 104. In some embodiments, measurement reporting message 214 may comprise a radio resource control (RRC) message. In various embodiments, measurement reporting message 214 may comprise a MeasurementReport message. In some embodiments, RSRQ reporting value 216 may be contained in an information element (IE) comprised within measurement reporting message 214. The embodiments are not limited in this context.

FIG. 3 illustrates an example of an RSRQ measurement report mapping table 300 that may be representative of an enhanced RSRQ measurement report mapping scheme that features an extended RSRQ reporting range in various embodiments. As shown in FIG. 3, RSRQ measurement report mapping table 300 defines a plurality of RSRQ measured quantity value subranges, and defines a corresponding RSRQ reporting value for each such subrange. Some of the RSRQ measured quantity value subranges are comprised in a legacy range 302, while other RSRQ measured quantity value subranges are comprised in an extended range 304. In some embodiments, legacy range 302 may comprise RSRQ measured quantity value subranges and corresponding RSRQ reporting values for a legacy RSRQ measurement report mapping scheme. In various embodiments, extended range 304 may comprise RSRQ measured quantity value subranges and corresponding RSRQ reporting values that enable reporting of RSRQ measurements that fall substantially outside an RSRQ measurement range contemplated by the legacy RSRQ measurement report mapping scheme. In this example, legacy range 302 comprises RSRQ measured quantity value subranges and corresponding RSRQ reporting values for RSRQ measurements of less than −3 dB, while extended range 304 defines a total of eleven RSRQ measured quantity value subranges and corresponding extended range RSRQ reporting values for RSRQ measurements ranging from −3 dB to 2.5 dB, with a granularity of 0.5 dB. Extended range 304 also comprises a twelfth extended range RSRQ reporting value, which corresponds to RSRQ measured quantity values that are greater than or equal to 2.5 dB. The embodiments are not limited to this example.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 4:
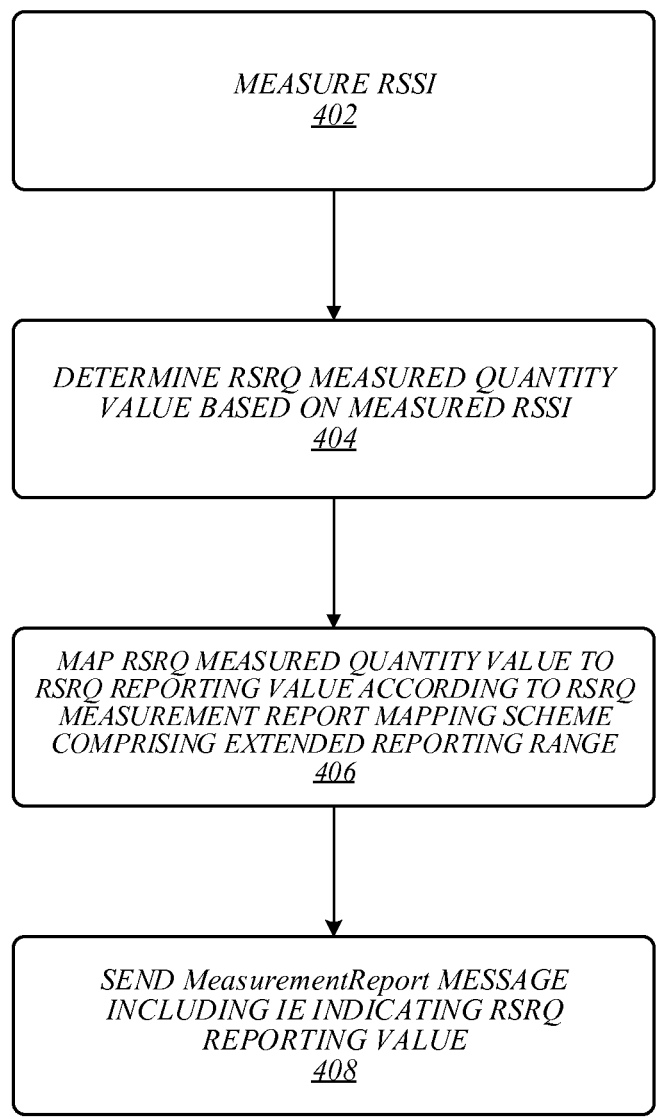
FIG. 4 illustrates an embodiment of a first logic flow.

FIG. 4 illustrates an example of a logic flow 400 that may be representative of operations that may be performed in some embodiments in conjunction with implementation of the disclosed reporting techniques for RSRQ measurements. For example, logic flow 400 may be representative of operations that may be performed in various embodiments by UE 102 of FIGS. 1 and 2. As shown in FIG. 4, an RSSI may be measured at 402. For example, in operating environment 200 of FIG. 2, UE 102 may measure an RSSI to determine RSSI measurement 208. At 404, an RSRQ measured quantity value may be determined based on the measured RSSI. For example, in operating environment 200 of FIG. 2, UE 102 may determine RSRQ measured quantity value 210 based on RSSI measurement 208.

At 406, the RSRQ measured quantity value may be mapped to an RSRQ reporting value according to an RSRQ measurement report mapping scheme comprising an extended reporting range. For example, in operating environment 200 of FIG. 2, UE 102 may map RSRQ measured quantity value 210 to RSRQ reporting value 216 according to RSRQ measurement report mapping information 212 corresponding to an RSRQ measurement report mapping scheme comprising an extended reporting range. In some embodiments, according to the extended reporting range, one or more defined RSRQ reporting values may correspond to RSRQ measured quantity values exceeding −3 dB. At 408, a MeasurementReport message may be sent that includes an IE indicating the RSRQ reporting value. For example, in operating environment 200 of FIG. 2, UE 102 may send a measurement reporting message 214 that comprises a MeasurementReport message that includes an IE indicating RSRQ reporting value 216. The embodiments are not limited to these examples.

Figure 5:
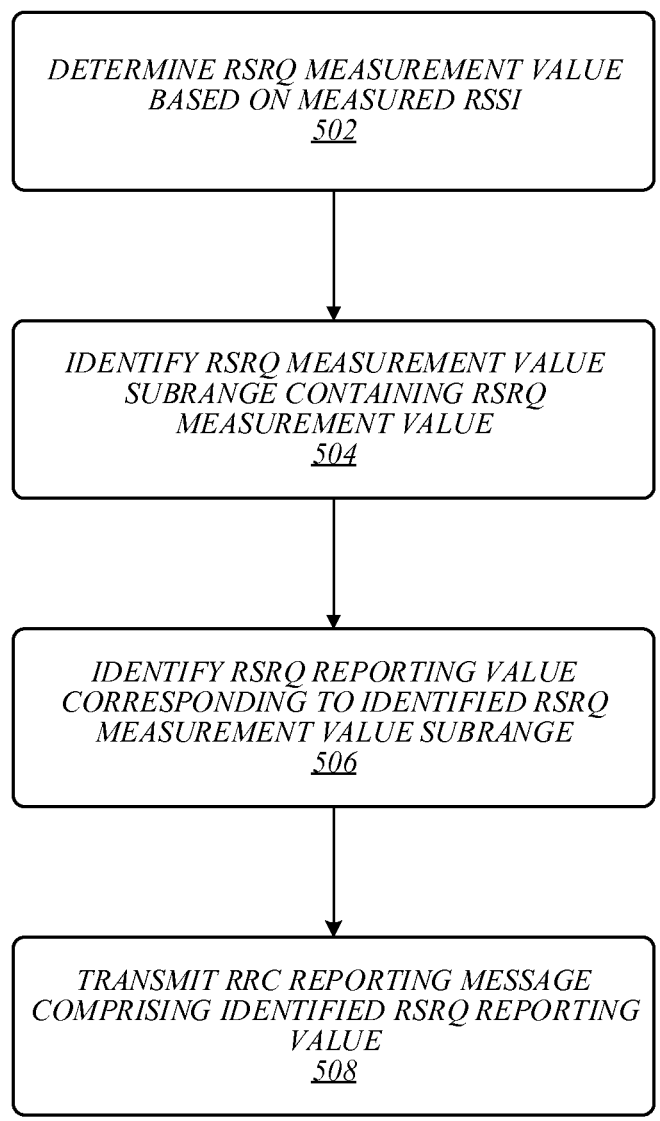
FIG. 5 illustrates an embodiment of a second logic flow.

FIG. 5 illustrates an example of a logic flow 500 that may be representative of operations that may be performed in various embodiments in conjunction with implementation of the disclosed reporting techniques for RSRQ measurements. For example, logic flow 500 may be representative of operations that may be performed in some embodiments by UE 102 of FIGS. 1 and 2. As shown in FIG. 5, an RSRQ measurement value may be determined based on a measured RSSI at 502. For example, in operating environment 200 of FIG. 2, UE 102 may determine RSRQ measured quantity value 210 based on RSSI measurement 208. At 504, an RSRQ measurement value subrange containing the RSRQ measurement value may be identified. For example, in operating environment 200 of FIG. 2, UE 102 may identify an RSRQ measurement value subrange containing RSRQ measured quantity value 210 based on RSRQ measurement report mapping information 212. In various embodiments, the RSRQ measurement value subrange may be comprised among a plurality of RSRQ measurement value subranges of an RSRQ measurement report mapping scheme. In some such embodiments, the plurality of RSRQ measurement value subranges may include one or more subranges corresponding to RSRQ measurement values of greater than −3 dB and may specify corresponding RSRQ reporting values for those RSRQ measurement value subranges.

At 506, an RSRQ reporting value corresponding to the identified RSRQ measurement value subrange may be identified. For example, in operating environment 200 of FIG. 2, UE 102 may identify RSRQ reporting value 216 as an RSRQ reporting value that corresponds to an RSRQ measurement value subrange containing RSRQ measured quantity value 210. At 508, an RRC reporting message may be transmitted that comprises the identified RSRQ reporting value. For example, in operating environment 200 of FIG. 2, UE 102 may send a measurement reporting message 214 comprising RRC reporting message that contains RSRQ reporting value 216. The embodiments are not limited to these examples.

Figure 6:
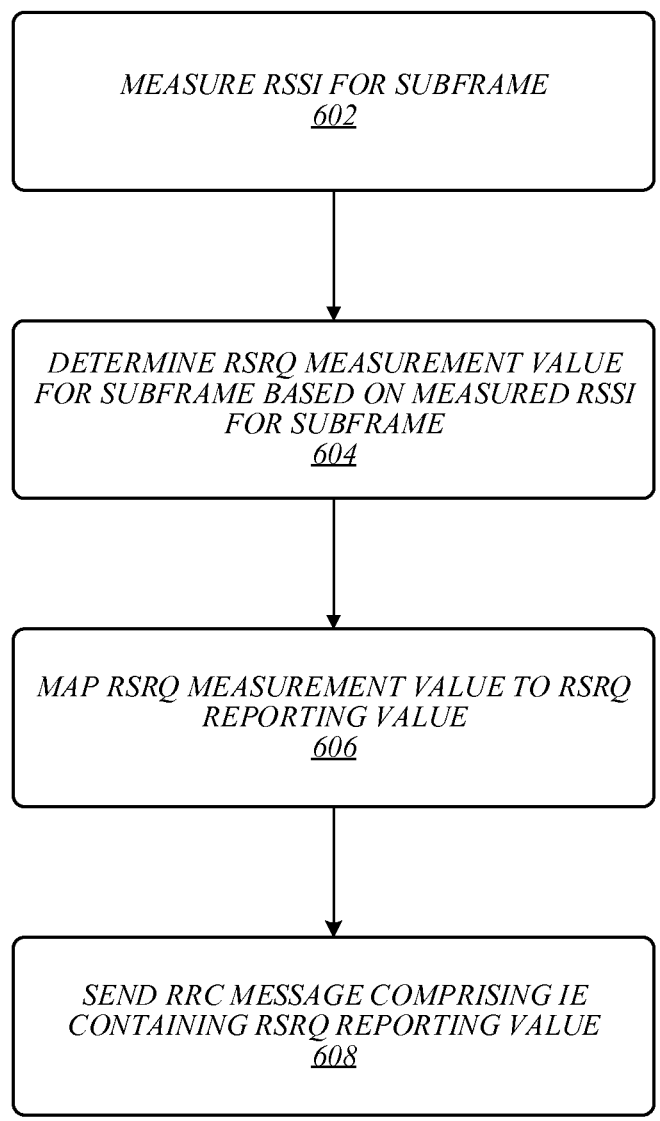
FIG. 6 illustrates an embodiment of a third logic flow.

FIG. 6 illustrates an example of a logic flow 600 that may be representative of operations that may be performed in various embodiments in conjunction with implementation of the disclosed reporting techniques for RSRQ measurements. For example, logic flow 600 may be representative of operations that may be performed in some embodiments by UE 102 of FIGS. 1 and 2. As shown in FIG. 6, an RSSI may be measured for a subframe at 602. For example, in operating environment 200 of FIG. 2, UE 102 may measure an RSSI for a subframe to determine RSSI measurement 208. At 604, an RSRQ measurement value for the subframe may be determined based on the measured RSSI for the subframe. For example, in operating environment 200 of FIG. 2, UE 102 may determine RSRQ measured quantity value 210 for a subframe based on an RSSI measurement 208 for that subframe.

At 606, the RSRQ measurement value may be mapped to an RSRQ reporting value. For example, in operating environment 200 of FIG. 2, UE 102 may map RSRQ measured quantity value 210 to RSRQ reporting value 216. In various embodiments, the RSRQ measurement value may be mapped to the RSRQ reporting value based on an RSRQ measurement report mapping scheme comprising an extended RSRQ reporting range. In some embodiments, according to the extended range, one or more defined RSRQ reporting values may collectively correspond to RSRQ measurement values ranging from −3 dB to 2.5 dB. At 608, an RRC message may be sent that comprises an IE containing the RSRQ reporting value. For example, in operating environment 200 of FIG. 2, UE 102 may send a measurement reporting message 214 that comprises an RRC message, and the RRC message may comprise an IE that contains RSRQ reporting value 216. The embodiments are not limited to these examples.

Figure 7:
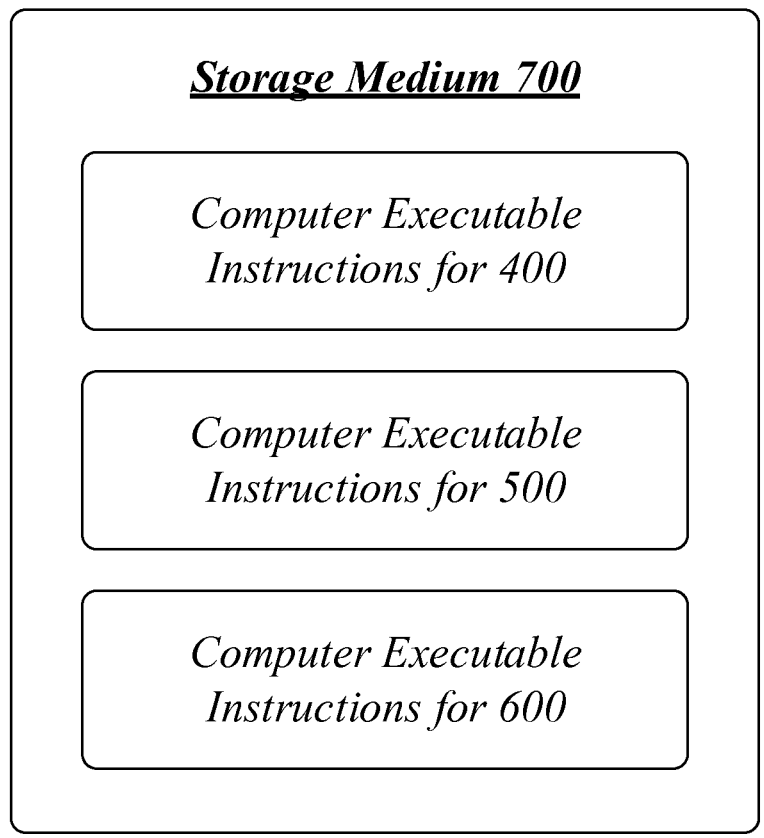
FIG. 7 illustrates an embodiment of a storage medium.

FIG. 7 illustrates an embodiment of a storage medium 700. Storage medium 700 may comprise any non-transitory computer-readable storage medium or machine-readable storage medium, such as an optical, magnetic or semiconductor storage medium. In various embodiments, storage medium 700 may comprise an article of manufacture. In some embodiments, storage medium 700 may store computer-executable instructions, such as computer-executable instructions to implement one or more of logic flow 400 of FIG. 4, logic flow 500 of FIG. 5, and logic flow 600 of FIG. 6. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 8:
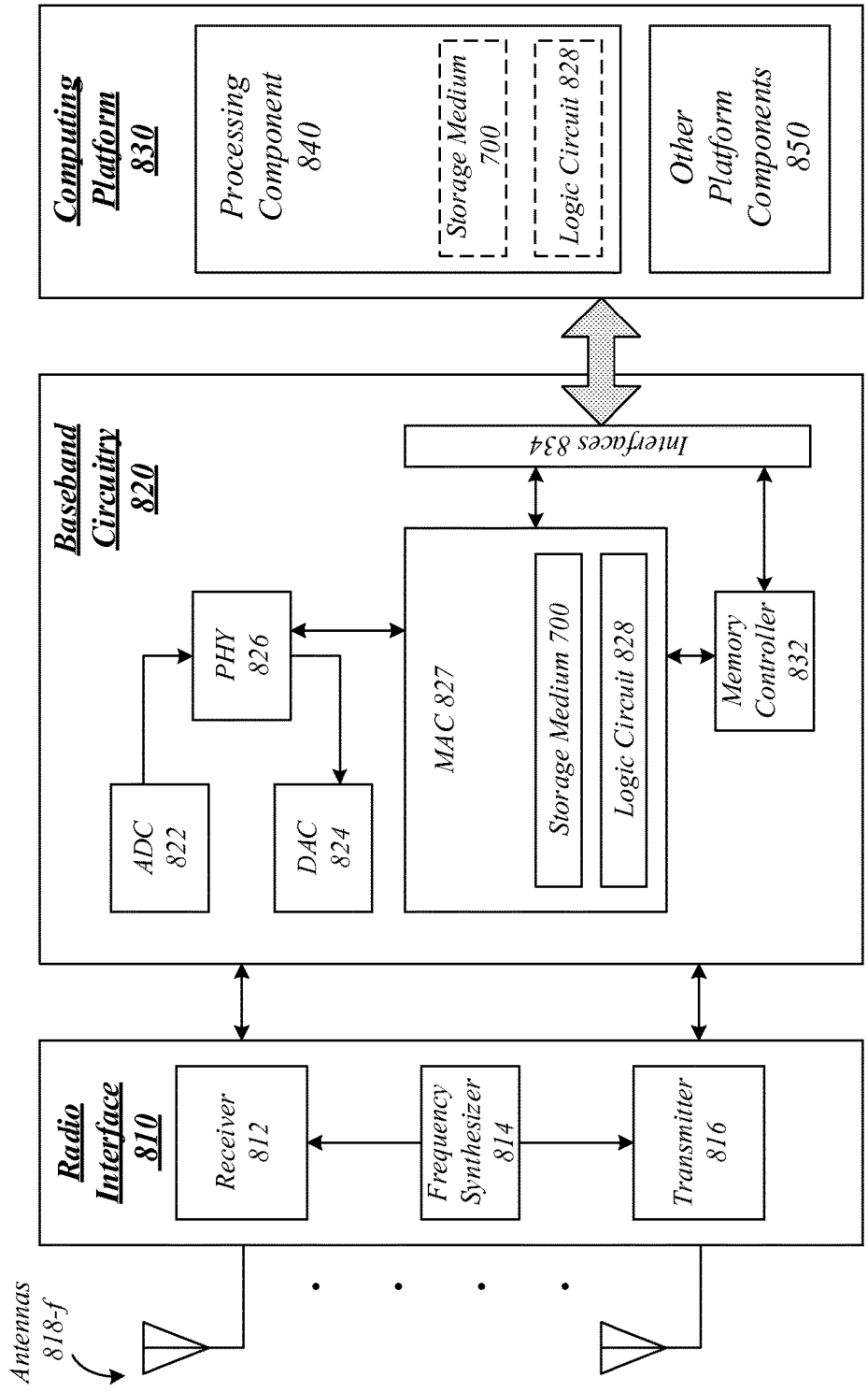
FIG. 8 illustrates an embodiment of a device.

FIG. 8 illustrates an embodiment of a communications device 800 that may implement one or more of UE 102 of FIGS. 1 and 2, logic flow 400 of FIG. 4, logic flow 500 of FIG. 5, logic flow 600 of FIG. 6, and storage medium 700 of FIG. 7. In various embodiments, device 800 may comprise a logic circuit 828. The logic circuit 828 may include physical circuits to perform operations described for one or more of UE 102 of FIGS. 1 and 2, logic flow 400 of FIG. 4, logic flow 500 of FIG. 5, and logic flow 600 of FIG. 6, for example. As shown in FIG. 8, device 800 may include a radio interface 810, baseband circuitry 820, and computing platform 830, although the embodiments are not limited to this configuration.

The device 800 may implement some or all of the structure and/or operations for one or more of UE 102 of FIGS. 1 and 2, logic flow 400 of FIG. 4, logic flow 500 of FIG. 5, logic flow 600 of FIG. 6, storage medium 700 of FIG. 7, and logic circuit 828 in a single computing entity, such as entirely within a single device. Alternatively, the device 800 may distribute portions of the structure and/or operations for one or more of UE 102 of FIGS. 1 and 2, logic flow 400 of FIG. 4, logic flow 500 of FIG. 5, logic flow 600 of FIG. 6, storage medium 700 of FIG. 7, and logic circuit 828 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 810 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 810 may include, for example, a receiver 812, a frequency synthesizer 814, and/or a transmitter 816. Radio interface 810 may include bias controls, a crystal oscillator and/or one or more antennas 818-f. In another embodiment, radio interface 810 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 820 may communicate with radio interface 810 to process receive and/or transmit signals and may include, for example, an analog-to-digital converter 822 for down converting received signals, a digital-to-analog converter 824 for up converting signals for transmission. Further, baseband circuitry 820 may include a baseband or physical layer (PHY) processing circuit 826 for PHY link layer processing of respective receive/transmit signals. Baseband circuitry 820 may include, for example, a medium access control (MAC) processing circuit 827 for MAC/data link layer processing. Baseband circuitry 820 may include a memory controller 832 for communicating with MAC processing circuit 827 and/or a computing platform 830, for example, via one or more interfaces 834.

In some embodiments, PHY processing circuit 826 may include a frame construction and/or detection module, in combination with additional circuitry such as a buffer memory, to construct and/or deconstruct communication frames. Alternatively or in addition, MAC processing circuit 827 may share processing for certain of these functions or perform these processes independent of PHY processing circuit 826. In some embodiments, MAC and PHY processing may be integrated into a single circuit.

The computing platform 830 may provide computing functionality for the device 800. As shown, the computing platform 830 may include a processing component 840. In addition to, or alternatively of, the baseband circuitry 820, the device 800 may execute processing operations or logic for one or more of UE 102 of FIGS. 1 and 2, logic flow 400 of FIG. 4, logic flow 500 of FIG. 5, logic flow 600 of FIG. 6, storage medium 700 of FIG. 7, and logic circuit 828 using the processing component 840. The processing component 840 (and/or PHY 826 and/or MAC 827) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 830 may further include other platform components 850. Other platform components 850 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 800 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 800 described herein, may be included or omitted in various embodiments of device 800, as suitably desired.

Embodiments of device 800 may be implemented using single input single output (SISO) architectures. However, certain implementations may include multiple antennas (e.g., antennas 818-*f*) for transmission and/or reception using adaptive antenna techniques for beamforming or spatial division multiple access (SDMA) and/or using MIMO communication techniques.

The components and features of device 800 may be implemented using any combination of discrete circuitry, application specific integrated circuits (ASICs), logic gates and/or single chip architectures. Further, the features of device 800 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 800 shown in the block diagram of FIG. 8 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 9:
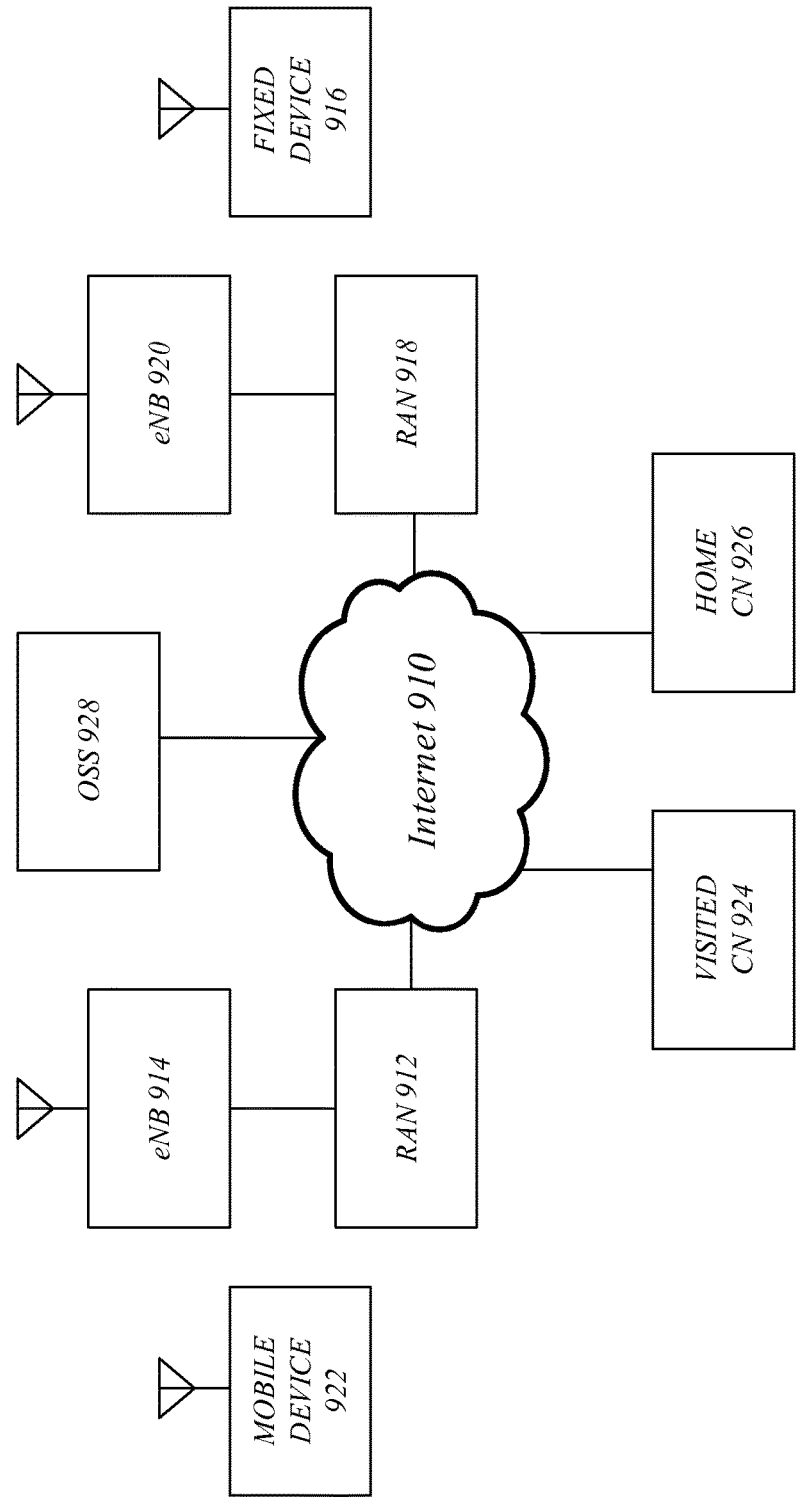
FIG. 9 illustrates an embodiment of wireless network.

FIG. 9 illustrates an embodiment of a broadband wireless access system 900. As shown in FIG. 9, broadband wireless access system 900 may be an internet protocol (IP) type network comprising an internet 910 type network or the like that is capable of supporting mobile wireless access and/or fixed wireless access to internet 910. In one or more embodiments, broadband wireless access system 900 may comprise any type of orthogonal frequency division multiple access (OFDMA)-based or single-carrier frequency division multiple access (SC-FDMA)-based wireless network, such as a system compliant with one or more of the 3GPP LTE Specifications and/or IEEE 802.16 Standards, and the scope of the claimed subject matter is not limited in these respects.

In the exemplary broadband wireless access system 900, radio access networks (RANs) 912 and 918 are capable of coupling with evolved node Bs (eNBs) 914 and 920, respectively, to provide wireless communication between one or more fixed devices 916 and internet 910 and/or between or one or more mobile devices 922 and Internet 910. One example of a fixed device 916 and a mobile device 922 is device 800 of FIG. 8, with the fixed device 916 comprising a stationary version of device 800 and the mobile device 922 comprising a mobile version of device 800. RANs 912 and 918 may implement profiles that are capable of defining the mapping of network functions to one or more physical entities on broadband wireless access system 900. eNBs 914 and 920 may comprise radio equipment to provide RF communication with fixed device 916 and/or mobile device 922, such as described with reference to device 800, and may comprise, for example, the PHY and MAC layer equipment in compliance with a 3GPP LTE Specification or an IEEE 802.16 Standard. eNBs 914 and 920 may further comprise an IP backplane to couple to Internet 910 via RANs 912 and 918, respectively, although the scope of the claimed subject matter is not limited in these respects.

Broadband wireless access system 900 may further comprise a visited core network (CN) 924 and/or a home CN 926, each of which may be capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CN 924 and/or home CN 926, and the scope of the claimed subject matter is not limited in these respects. Visited CN 924 may be referred to as a visited CN in the case where visited CN 924 is not part of the regular service provider of fixed device 916 or mobile device 922, for example where fixed device 916 or mobile device 922 is roaming away from its respective home CN 926, or where broadband wireless access system 900 is part of the regular service provider of fixed device 916 or mobile device 922 but where broadband wireless access system 900 may be in another location or state that is not the main or home location of fixed device 916 or mobile device 922. The embodiments are not limited in this context.

Fixed device 916 may be located anywhere within range of one or both of eNBs 914 and 920, such as in or near a home or business to provide home or business customer broadband access to Internet 910 via eNBs 914 and 920 and RANs 912 and 918, respectively, and home CN 926. It is worthy of note that although fixed device 916 is generally disposed in a stationary location, it may be moved to different locations as needed. Mobile device 922 may be utilized at one or more locations if mobile device 922 is within range of one or both of eNBs 914 and 920, for example. In accordance with one or more embodiments, operation support system (OSS) 928 may be part of broadband wireless access system 900 to provide management functions for broadband wireless access system 900 and to provide interfaces between functional entities of broadband wireless access system 900. Broadband wireless access system 900 of FIG. 9 is merely one type of wireless network showing a certain number of the components of broadband wireless access system 900, and the scope of the claimed subject matter is not limited in these respects.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Example 1 is an apparatus, comprising logic, at least a portion of which is in hardware, the logic to measure a received signal strength indicator (RSSI), determine a reference signal received quality (RSRQ) measured quantity value based on the measured RSSI, and map the RSRQ measured quantity value to an RSRQ reporting value according to an RSRQ measurement report mapping scheme comprising an extended RSRQ reporting range according to which one or more defined RSRQ reporting values correspond to RSRQ measured quantity values exceeding −3 dB.

Example 2 is the apparatus of Example 1, the RSRQ measurement report mapping scheme to specify a corresponding RSRQ reporting value for each possible RSRQ measured quantity value that both exceeds −3 dB and is less than or equal to 2.5 dB.

Example 3 is the apparatus of Example 1, the RSRQ measurement report mapping scheme to define a plurality of RSRQ measured quantity value subranges and a plurality of RSRQ reporting values, each of the plurality of RSRQ reporting values to correspond to a respective one of the plurality of RSRQ measured quantity value subranges.

Example 4 is the apparatus of Example 3, the RSRQ measurement report mapping scheme to map RSRQ measured quantity values to RSRQ reporting values with a resolution of 0.5 dB.

Example 5 is the apparatus of Example 1, the measured RSSI to comprise an RSSI for a subframe, the determined RSRQ measured quantity value to comprise an RSRQ measured quantity value for the subframe.

Example 6 is the apparatus of Example 5, the logic to measure the RSSI over all OFDM symbols in the subframe.

Example 7 is the apparatus of Example 1, the logic to measure the RSSI for a measurement bandwidth.

Example 8 is the apparatus of Example 1, the logic to send a MeasurementReport message including an information element (IE) indicating the RSRQ reporting value.

Example 9. User equipment (UE), comprising the apparatus of any of Examples 1 to 8, at least one radio frequency (RF) transceiver, and at least one RF antenna.

Example 10 is the UE of Example 9, comprising at least one memory unit, and a touchscreen display.

Example 11 is at least one non-transitory computer-readable storage medium comprising a set of instructions that, in response to being executed at user equipment (UE), cause the UE to determine a reference signal received quality (RSRQ) measurement value based on a measured received signal strength indicator (RSSI), identify, from among a plurality of RSRQ measurement value subranges of an RSRQ measurement report mapping scheme, an RSRQ measurement value subrange containing the RSRQ measurement value, the plurality of RSRQ measurement value subranges to include one or more subranges corresponding to RSRQ measurement values of greater than −3 dB, the RSRQ measurement report mapping scheme to specify corresponding RSRQ reporting values for the RSRQ measurement value subranges, and identify an RSRQ reporting value corresponding to the identified RSRQ measurement value subrange.

Example 12 is the at least one non-transitory computer-readable storage medium of Example 11, comprising instructions that, in response to being executed at the UE, cause the UE to transmit a radio resource control (RRC) reporting message comprising the identified RSRQ reporting value.

Example 13 is the at least one non-transitory computer-readable storage medium of Example 11, the RSRQ measurement report mapping scheme to define the plurality of RSRQ measurement value subranges with a granularity of 0.5 dB.

Example 14 is the at least one non-transitory computer-readable storage medium of Example 11, the RSRQ measurement report mapping scheme to implement an extended RSRQ reporting range.

Example 15 is the at least one non-transitory computer-readable storage medium of Example 11, the plurality of RSRQ measurement value subranges to include 11 RSRQ measurement value subranges that collectively correspond to RSRQ measurement values ranging from −3 dB to 2.5 dB.

Example 16 is the at least one non-transitory computer-readable storage medium of Example 11, comprising instructions that, in response to being executed at the UE, cause the UE to determine the RSRQ measurement value for a subframe for which it measures the RSSI.

Example 17 is the at least one non-transitory computer-readable storage medium of Example 16, comprising instructions that, in response to being executed at the UE, cause the UE to measure the RSSI over all OFDM symbols of the subframe.

Example 18 is the at least one non-transitory computer-readable storage medium of Example 11, comprising instructions that, in response to being executed at the UE, cause the UE to determine the RSRQ measurement value for a bandwidth for which it measures the RSSI.

Example 19 is an apparatus, comprising logic, at least a portion of which is in hardware, the logic to measure a received signal strength indicator (RSSI) for a subframe, determine a reference signal received quality (RSRQ) measurement value for the subframe based on the measured RSSI for the subframe, and map the RSRQ measurement value to an RSRQ reporting value based on an RSRQ measurement report mapping scheme comprising an extended RSRQ reporting range according to which one or more defined RSRQ reporting values collectively correspond to RSRQ measurement values ranging from −3 dB to 2.5 dB.

Example 20 is the apparatus of Example 19, the logic to measure the RSSI for the subframe according to a resource element (RE) power allocation pattern associated with zero-traffic loading.

Example 21 is the apparatus of Example 19, the logic to generate a radio resource control (RRC) message comprising an information element (IE) that contains the RSRQ reporting value.

Example 22 is the apparatus of Example 19, the RSRQ measurement report mapping scheme to map RSRQ measurement values to RSRQ reporting values with a granularity of 0.5 dB.

Example 23 is the apparatus of Example 19, the logic to measure the RSSI for the subframe over all OFDM symbols of the subframe.

Example 24 is the apparatus of Example 19, the logic to measure the RSSI for a measurement bandwidth.

Example 25 is the apparatus of Example 19, the RSRQ measurement report mapping scheme to define a plurality of RSRQ measurement value subranges and a plurality of RSRQ reporting values, each of the plurality of RSRQ reporting values to correspond to a respective one of the plurality of RSRQ measurement value subranges.

Example 26 is the apparatus of Example 25, the logic to identify an RSRQ measurement value subrange that contains the RSRQ measurement value and identify the RSRQ reporting value as an RSRQ reporting value that corresponds to the identified RSRQ measurement value subrange.

Example 27. User equipment (UE), comprising the apparatus of any of Examples 19 to 26, one or more radio frequency (RF) transceivers, and one or more RF antennas.

Example 28 is the UE of Example 27, comprising a touchscreen display.

Example 29 is at least one non-transitory computer-readable storage medium comprising a set of instructions that, in response to being executed at user equipment (UE), cause the UE to measure a received signal strength indicator (RSSI), determine a reference signal received quality (RSRQ) measured quantity value based on the measured RSSI, and map the RSRQ measured quantity value to an RSRQ reporting value according to an RSRQ measurement report mapping scheme comprising an extended RSRQ reporting range according to which one or more defined RSRQ reporting values correspond to RSRQ measured quantity values exceeding −3 dB.

Example 30 is the at least one non-transitory computer-readable storage medium of Example 29, the RSRQ measurement report mapping scheme to specify a corresponding RSRQ reporting value for each possible RSRQ measured quantity value that both exceeds −3 dB and is less than or equal to 2.5 dB.

Example 31 is the at least one non-transitory computer-readable storage medium of Example 29, the RSRQ measurement report mapping scheme to define a plurality of RSRQ measured quantity value subranges and a plurality of RSRQ reporting values, each of the plurality of RSRQ reporting values to correspond to a respective one of the plurality of RSRQ measured quantity value subranges.

Example 32 is the at least one non-transitory computer-readable storage medium of Example 31, the RSRQ measurement report mapping scheme to map RSRQ measured quantity values to RSRQ reporting values with a resolution of 0.5 dB.

Example 33 is the at least one non-transitory computer-readable storage medium of Example 29, the measured RSSI to comprise an RSSI for a subframe, the determined RSRQ measured quantity value to comprise an RSRQ measured quantity value for the subframe.

Example 34 is the at least one non-transitory computer-readable storage medium of Example 33, comprising instructions that, in response to being executed at the UE, cause the UE to measure the RSSI over all OFDM symbols in the subframe.

Example 35 is the at least one non-transitory computer-readable storage medium of Example 29, comprising instructions that, in response to being executed at the UE, cause the UE to measure the RSSI for a measurement bandwidth.

Example 36 is the at least one non-transitory computer-readable storage medium of Example 29, comprising instructions that, in response to being executed at the UE, cause the UE to send a MeasurementReport message including an information element (IE) indicating the RSRQ reporting value.

Example 37 is a method, comprising determining, by processing circuitry at user equipment (UE), a reference signal received quality (RSRQ) measurement value based on a measured received signal strength indicator (RSSI), identifying, from among a plurality of RSRQ measurement value subranges of an RSRQ measurement report mapping scheme, an RSRQ measurement value subrange containing the RSRQ measurement value, the plurality of RSRQ measurement value subranges to include one or more subranges corresponding to RSRQ measurement values of greater than −3 dB, the RSRQ measurement report mapping scheme to specify corresponding RSRQ reporting values for the RSRQ measurement value subranges, and identifying an RSRQ reporting value corresponding to the identified RSRQ measurement value subrange.

Example 38 is the method of Example 37, comprising transmitting a radio resource control (RRC) reporting message comprising the identified RSRQ reporting value.

Example 39 is the method of Example 37, the RSRQ measurement report mapping scheme to define the plurality of RSRQ measurement value subranges with a granularity of 0.5 dB.

Example 40 is the method of Example 37, the RSRQ measurement report mapping scheme to implement an extended RSRQ reporting range.

Example 41 is the method of Example 37, the plurality of RSRQ measurement value subranges to include 11 RSRQ measurement value subranges that collectively correspond to RSRQ measurement values ranging from −3 dB to 2.5 dB.

Example 42 is the method of Example 37, comprising determining the RSRQ measurement value for a subframe for which it measures the RSSI.

Example 43 is the method of Example 42, comprising measuring the RSSI over all OFDM symbols of the subframe.

Example 44 is the method of Example 37, comprising determining the RSRQ measurement value for a bandwidth for which it measures the RSSI.

Example 45 is at least one non-transitory computer-readable storage medium comprising a set of instructions that, in response to being executed on a computing device, cause the computing device to perform a method according to any of Examples 37 to 44.

Example 46 is an apparatus, comprising means for performing a method according to any of Examples 37 to 44.

Example 47 is a system, comprising the apparatus of Example 46, one or more radio frequency (RF) transceivers, and one or more RF antennas.

Example 48 is the system of Example 47, comprising a touchscreen display.

Example 49 is at least one non-transitory computer-readable storage medium comprising a set of instructions that, in response to being executed at user equipment (UE), cause the UE to measure a received signal strength indicator (RSSI) for a subframe, determine a reference signal received quality (RSRQ) measurement value for the subframe based on the measured RSSI for the subframe, and map the RSRQ measurement value to an RSRQ reporting value based on an RSRQ measurement report mapping scheme comprising an extended RSRQ reporting range according to which one or more defined RSRQ reporting values collectively correspond to RSRQ measurement values ranging from −3 dB to 2.5 dB.

Example 50 is the at least one non-transitory computer-readable storage medium of Example 49, comprising instructions that, in response to being executed at the UE, cause the UE to measure the RSSI for the subframe according to a resource element (RE) power allocation pattern associated with zero-traffic loading.

Example 51 is the at least one non-transitory computer-readable storage medium of Example 49, comprising instructions that, in response to being executed at the UE, cause the UE to generate a radio resource control (RRC) message comprising an information element (IE) that contains the RSRQ reporting value.

Example 52 is the at least one non-transitory computer-readable storage medium of Example 49, the RSRQ measurement report mapping scheme to map RSRQ measurement values to RSRQ reporting values with a granularity of 0.5 dB.

Example 53 is the at least one non-transitory computer-readable storage medium of Example 49, comprising instructions that, in response to being executed at the UE, cause the UE to measure the RSSI for the subframe over all OFDM symbols of the subframe.

Example 54 is the at least one non-transitory computer-readable storage medium of Example 49, comprising instructions that, in response to being executed at the UE, cause the UE to measure the RSSI for a measurement bandwidth.

Example 55 is the at least one non-transitory computer-readable storage medium of Example 49, the RSRQ measurement report mapping scheme to define a plurality of RSRQ measurement value subranges and a plurality of RSRQ reporting values, each of the plurality of RSRQ reporting values to correspond to a respective one of the plurality of RSRQ measurement value subranges.

Example 56 is the at least one non-transitory computer-readable storage medium of Example 55, comprising instructions that, in response to being executed at the UE, cause the UE to identify an RSRQ measurement value subrange that contains the RSRQ measurement value, and identify the RSRQ reporting value as an RSRQ reporting value that corresponds to the identified RSRQ measurement value subrange.

Example 57 is a method, comprising measuring, at user equipment (UE), a received signal strength indicator (RSSI), determining, by processing circuitry of the UE, a reference signal received quality (RSRQ) measured quantity value based on the measured RSSI, and mapping the RSRQ measured quantity value to an RSRQ reporting value according to an RSRQ measurement report mapping scheme comprising an extended RSRQ reporting range according to which one or more defined RSRQ reporting values correspond to RSRQ measured quantity values exceeding −3 dB.

Example 58 is the method of Example 57, the RSRQ measurement report mapping scheme to specify a corresponding RSRQ reporting value for each possible RSRQ measured quantity value that both exceeds −3 dB and is less than or equal to 2.5 dB.

Example 59 is the method of Example 57, the RSRQ measurement report mapping scheme to define a plurality of RSRQ measured quantity value subranges and a plurality of RSRQ reporting values, each of the plurality of RSRQ reporting values to correspond to a respective one of the plurality of RSRQ measured quantity value subranges.

Example 60 is the method of Example 59, the RSRQ measurement report mapping scheme to map RSRQ measured quantity values to RSRQ reporting values with a resolution of 0.5 dB.

Example 61 is the method of Example 57, the measured RSSI to comprise an RSSI for a subframe, the determined RSRQ measured quantity value to comprise an RSRQ measured quantity value for the subframe.

Example 62 is the method of Example 61, comprising measuring the RSSI over all OFDM symbols in the subframe.

Example 63 is the method of Example 57, comprising measuring the RSSI for a measurement bandwidth.

Example 64 is the method of Example 57, comprising sending a MeasurementReport message including an information element (IE) indicating the RSRQ reporting value.

Example 65 is at least one non-transitory computer-readable storage medium comprising a set of instructions that, in response to being executed on a computing device, cause the computing device to perform a method according to any of Examples 57 to 64.

Example 66 is an apparatus, comprising means for performing a method according to any of Examples 57 to 64.

Example 67 is a system, comprising the apparatus of Example 66, one or more radio frequency (RF) transceivers, and one or more RF antennas.

Example 68 is the system of Example 67, comprising a touchscreen display.

Example 69 is an apparatus, comprising logic, at least a portion of which is in hardware, the logic to determine a reference signal received quality (RSRQ) measurement value based on a measured received signal strength indicator (RSSI), identify, from among a plurality of RSRQ measurement value subranges of an RSRQ measurement report mapping scheme, an RSRQ measurement value subrange containing the RSRQ measurement value, the plurality of RSRQ measurement value subranges to include one or more subranges corresponding to RSRQ measurement values of greater than −3 dB, the RSRQ measurement report mapping scheme to specify corresponding RSRQ reporting values for the RSRQ measurement value subranges, the logic to identify an RSRQ reporting value corresponding to the identified RSRQ measurement value subrange.

Example 70 is the apparatus of Example 69, the logic to generate a radio resource control (RRC) reporting message comprising the identified RSRQ reporting value.

Example 71 is the apparatus of Example 69, the RSRQ measurement report mapping scheme to define the plurality of RSRQ measurement value subranges with a granularity of 0.5 dB.

Example 72 is the apparatus of Example 69, the RSRQ measurement report mapping scheme to implement an extended RSRQ reporting range.

Example 73 is the apparatus of Example 69, the plurality of RSRQ measurement value subranges to include 11 RSRQ measurement value subranges that collectively correspond to RSRQ measurement values ranging from −3 dB to 2.5 dB.

Example 74 is the apparatus of Example 69, the logic to determine the RSRQ measurement value for a subframe for which it measures the RSSI.

Example 75 is the apparatus of Example 74, the logic to measure the RSSI over all OFDM symbols of the subframe.

Example 76 is the apparatus of Example 69, the logic to determine the RSRQ measurement value for a bandwidth for which it measures the RSSI.

Example 77 is a system, comprising an apparatus according to of any of Examples 69 to 76, one or more radio frequency (RF) transceivers, and one or more RF antennas.

Example 78 is the system of Example 77, comprising a touchscreen display.

Example 79 is a method, comprising measuring, at user equipment (UE), a received signal strength indicator (RSSI) for a subframe, determining, by processing circuitry of the UE, a reference signal received quality (RSRQ) measurement value for the subframe based on the measured RSSI for the subframe, and mapping the RSRQ measurement value to an RSRQ reporting value based on an RSRQ measurement report mapping scheme comprising an extended RSRQ reporting range according to which one or more defined RSRQ reporting values collectively correspond to RSRQ measurement values ranging from −3 dB to 2.5 dB.

Example 80 is the method of Example 79, comprising measuring the RSSI for the subframe according to a resource element (RE) power allocation pattern associated with zero-traffic loading.

Example 81 is the method of Example 79, comprising generating a radio resource control (RRC) message comprising an information element (IE) that contains the RSRQ reporting value.

Example 82 is the method of Example 79, the RSRQ measurement report mapping scheme to map RSRQ measurement values to RSRQ reporting values with a granularity of 0.5 dB.

Example 83 is the method of Example 79, comprising measuring the RSSI for the subframe over all OFDM symbols of the subframe.

Example 84 is the method of Example 79, comprising measuring the RSSI for a measurement bandwidth.

Example 85 is the method of Example 79, the RSRQ measurement report mapping scheme to define a plurality of RSRQ measurement value subranges and a plurality of RSRQ reporting values, each of the plurality of RSRQ reporting values to correspond to a respective one of the plurality of RSRQ measurement value subranges.

Example 86 is the method of Example 85, comprising identifying an RSRQ measurement value subrange that contains the RSRQ measurement value, and identifying the RSRQ reporting value as an RSRQ reporting value that corresponds to the identified RSRQ measurement value subrange.

Example 87 is at least one non-transitory computer-readable storage medium comprising a set of instructions that, in response to being executed on a computing device, cause the computing device to perform a method according to any of Examples 79 to 86.

Example 88 is an apparatus, comprising means for performing a method according to any of Examples 79 to 86.

Example 89 is a system, comprising the apparatus of Example 88, one or more radio frequency (RF) transceivers, and one or more RF antennas.

Example 90 is the system of Example 89, comprising a touchscreen display.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. User equipment (UE), comprising:
at least one radio frequency (RF) transceiver;
at least one RF antenna; and
logic, at least a portion of which is in hardware, the logic to measure a received signal strength indicator (RSSI), determine a reference signal received quality (RSRQ) measured quantity value based on the measured RSSI, and map the RSRQ measured quantity value to an RSRQ reporting value according to an RSRQ measurement report mapping scheme comprising an extended RSRQ reporting range according to which two or more defined RSRQ reporting values correspond to RSRQ measured quantity values exceeding −3 dB and less than or equal to 2.5 dB, and send a MeasurementReport message including an information element (IE) indicating the RSRQ reporting value.

2. The UE of claim 1, the RSRQ measurement report mapping scheme to specify a corresponding RSRQ reporting value for each possible RSRQ measured quantity value that both exceeds −3 dB and is less than or equal to 2.5 dB.

3. The UE of claim 1, the RSRQ measurement report mapping scheme to define a plurality of RSRQ measured quantity value subranges and a plurality of RSRQ reporting values, each of the plurality of RSRQ reporting values to correspond to a respective one of the plurality of RSRQ measured quantity value subranges.

4. The UE of claim 3, the RSRQ measurement report mapping scheme to map RSRQ measured quantity values to RSRQ reporting values with a resolution of 0.5 dB.

5. The UE of claim 1, the measured RSSI to comprise an RSSI for a subframe, the determined RSRQ measured quantity value to comprise an RSRQ measured quantity value for the subframe.

6. The UE of claim 5, the logic to measure the RSSI over all OFDM symbols in the subframe.

7. The UE of claim 1, the logic to measure the RSSI for a measurement bandwidth.

8. The UE of claim 1, comprising:
at least one memory unit; and
a touchscreen display.

9. At least one non-transitory computer-readable storage medium comprising a set of instructions that, in response to being executed at user equipment (UE), cause the UE to:
determine a reference signal received quality (RSRQ) measurement value based on a measured received signal strength indicator (RSSI);
identify, from among a plurality of RSRQ measurement value subranges of an RSRQ measurement report mapping scheme, an RSRQ measurement value subrange containing the RSRQ measurement value, the plurality of RSRQ measurement value subranges to include two or more subranges corresponding to RSRQ measurement values of greater than −3 dB and less than or equal to 2.5 dB, the RSRQ measurement report mapping scheme to specify corresponding RSRQ reporting values for the RSRQ measurement value subranges;
identify an RSRQ reporting value corresponding to the identified RSRQ measurement value subrange; and cause transmission of a radio resource control (RRC) reporting message comprising the identified RSRQ reporting value.

10. The at least one non-transitory computer-readable storage medium of claim 9, the RSRQ measurement report mapping scheme to define the plurality of RSRQ measurement value subranges with a granularity of 0.5 dB.

11. The at least one non-transitory computer-readable storage medium of claim 9, the RSRQ measurement report mapping scheme to implement an extended RSRQ reporting range.

12. The at least one non-transitory computer-readable storage medium of claim 9, the plurality of RSRQ measurement value subranges to include 11 RSRQ measurement value subranges that collectively correspond to RSRQ measurement values ranging from −3 dB to 2.5 dB.

13. The at least one non-transitory computer-readable storage medium of claim 9, comprising instructions that, in response to being executed at the UE, cause the UE to determine the RSRQ measurement value for a subframe for which it measures the RSSI.

14. The at least one non-transitory computer-readable storage medium of claim 13, comprising instructions that, in response to being executed at the UE, cause the UE to measure the RSSI over all OFDM symbols of the subframe.

15. The at least one non-transitory computer-readable storage medium of claim 9, comprising instructions that, in response to being executed at the UE, cause the UE to determine the RSRQ measurement value for a bandwidth for which it measures the RSSI.

16. An apparatus, comprising:
logic, at least a portion of which is in hardware, the logic to measure a received signal strength indicator (RSSI) for a subframe, determine a reference signal received quality (RSRQ) measurement value for the subframe based on the measured RSSI for the subframe, and map the RSRQ measurement value to an RSRQ reporting value based on an RSRQ measurement report mapping scheme comprising an extended RSRQ reporting range according to which two or more defined RSRQ reporting values collectively correspond to RSRQ measurement values ranging from −3 dB to 2.5 dB, and generate a radio resource control (RRC) message comprising an information element (IE) that contains the RSRQ reporting value.

17. The apparatus of claim 16, the logic to measure the RSSI for the subframe according to a resource element (RE) power allocation pattern associated with zero-traffic loading.

18. The apparatus of claim 16, the RSRQ measurement report mapping scheme to map RSRQ measurement values to RSRQ reporting values with a granularity of 0.5 dB.

19. The apparatus of claim 16, the logic to measure the RSSI for the subframe over all OFDM symbols of the subframe.

20. The apparatus of claim 16, the logic to measure the RSSI for a measurement bandwidth.

21. The apparatus of claim 16, the RSRQ measurement report mapping scheme to define a plurality of RSRQ measurement value subranges and a plurality of RSRQ reporting values, each of the plurality of RSRQ reporting values to correspond to a respective one of the plurality of RSRQ measurement value subranges.

22. The apparatus of claim 21, the logic to identify an RSRQ measurement value subrange that contains the RSRQ measurement value and identify the RSRQ reporting value as an RSRQ reporting value that corresponds to the identified RSRQ measurement value subrange.

23. User equipment (UE), comprising:
the apparatus of claim 16;
one or more radio frequency (RF) transceivers; and
one or more RF antennas.

24. The UE of claim 23, comprising a touchscreen display.

* * * * *